United States Patent [19]

Tendler

[11] Patent Number: 5,555,286

[45] Date of Patent: Sep. 10, 1996

[54] CELLULAR PHONE BASED AUTOMATIC EMERGENCY VESSEL/VEHICLE LOCATION SYSTEM

[75] Inventor: Robert K. Tendler, Chestnut Hill, Mass.

[73] Assignee: Tendler Technologies, Inc., Chestnut Hill, Mass.

[21] Appl. No.: 515,100

[22] Filed: Aug. 14, 1995

Related U.S. Application Data

[63] Continuation of Ser. No. 189,135, Jan. 31, 1994, abandoned.

[51] Int. Cl.$^6$ .................................................. H04M 11/00
[52] U.S. Cl. ................................ 379/59; 379/40; 379/41; 379/51
[58] Field of Search .................................. 379/58, 59, 63, 379/37, 40, 41, 39, 51; 340/996

[56] References Cited

U.S. PATENT DOCUMENTS

| | | | |
|---|---|---|---|
| 4,833,477 | 5/1989 | Tendler | 342/389 |
| 5,081,667 | 1/1992 | Drori et al. | 379/59 |
| 5,388,147 | 2/1995 | Grimes | 379/59 |

*Primary Examiner*—Curtis Kuntz
*Assistant Examiner*—G. J. Oehling
*Attorney, Agent, or Firm*—Robert K. Tendler, Esq

[57] ABSTRACT

A cellular phone based emergency vessel/vehicle location system which includes a navigation unit to determine position and speech synthesis to modulate a transmitter with the emergency message includes a combined dialer and activation detector, in which activation may either be from the cellular phone keypad or from a panic button, a Lojack/hijack sensor, a car theft alarm, airbag deployment, a man down sensor, or other form of remote activation. Upon activation, the activation detector/dialer causes DTMF tones to be generated for telephone number dialing. After dialing, the transmitter for the transceiver is modulated with the emergency message in natural speech. In one embodiment, the dialer and activation detector is actuated from the keypad of the cellular phone, such as 911, *CG, *SP or other predetermined activation code. As a further feature, the number to be dialed is entered into the dialer prior to using the device, or optionally, the number to be dialed can be transmitted to the cellular phone and thence to the dialer when, for instance, a cellular phone is within range of a given cell site.

7 Claims, 1 Drawing Sheet

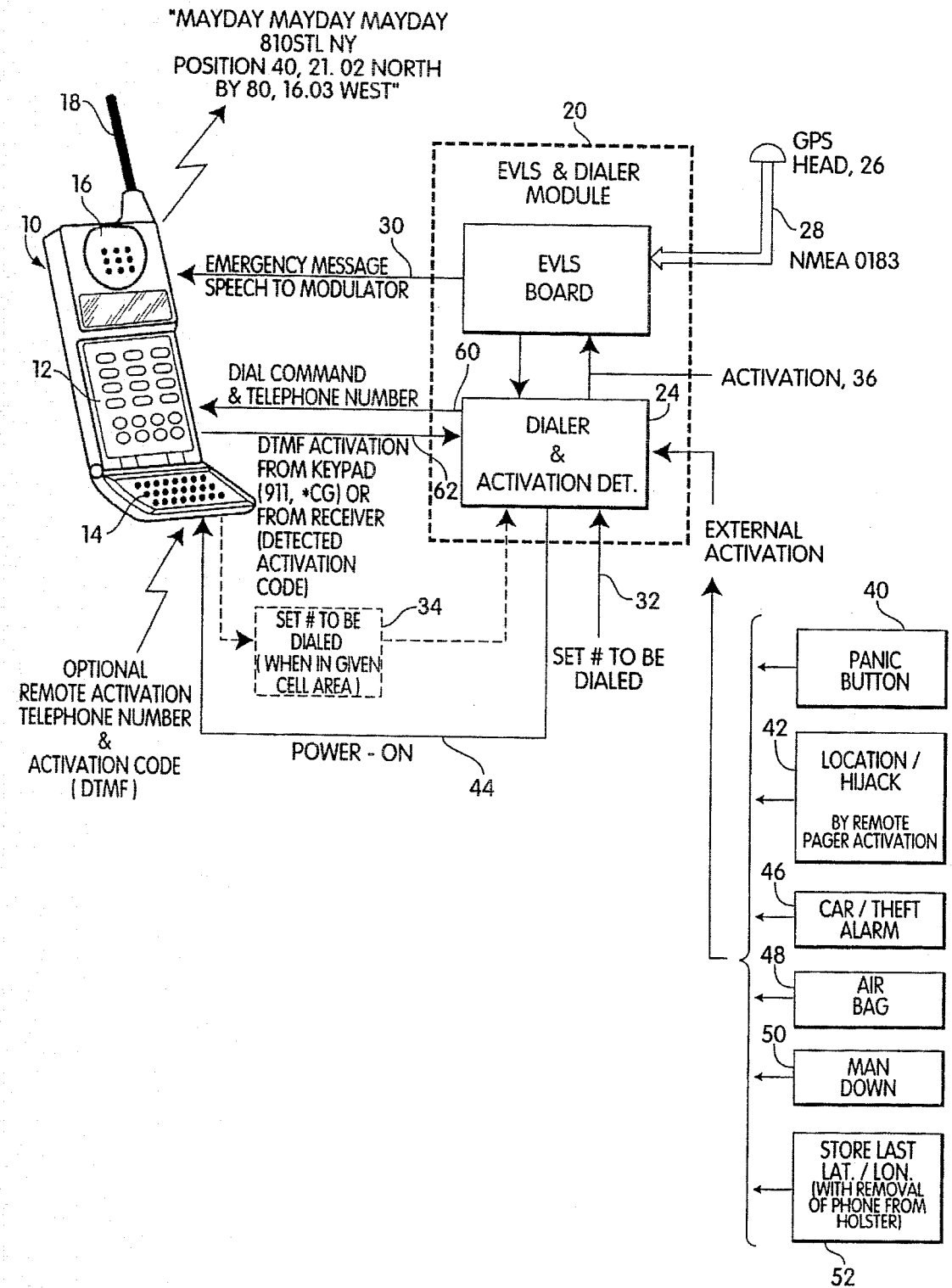

CELLULAR PHONE BASED AUTOMATIC EMERGENCY VESSEL/VEHICLE LOCATION SYSTEM

This is a continuation of application Ser. No. 08/189,135, field on Jan. 31, 1994, abandoned.

FIELD OF INVENTION

This invention relates to emergency signalling and more particularly to a system incorporating a synthesized voice message for use with telephones in which a predetermined telephone number is dialed upon activation of the system followed by a verbal message including the geographic coordinates of the telephone.

BACKGROUND OF THE INVENTION

As illustrated in U.S. Pat. No. 4,833,477 issued to Robert K. Tendler and incorporated herein by reference, an emergency vessel location system is described in which, upon activation, latitude and longitude from a navigation unit is decoded and provided in synthesized voice to the modulation section of a transmitter. As a result the transmitter transmits not only the fact of a mayday situation, but also decoded latitude and longitude, all in human synthesized voice. As described in U.S. patent application Ser. No. 08/527,588, the system for modulating the transmitter section of a transceiver includes means for entering a vehicle or a vessel identification number, in one case via a verbal scroll technique. In any event, the emergency message includes not only the mayday indication but also verbalization of an identification number, in this case a vehicle or a vessel identification number, as well as the decoded latitude and longitude.

While the above system was designed to be utilized with a transceiver which broadcasts on a designated emergency frequency or channel, such as channel 16 for VHF radio, channel 9 for citizens' band radio or a frequency of 155.475 MHz for police/EMT emergency purposes, it became apparent that cellular communication systems provided a further opportunity to expand emergency signalling. As is common practice, cellular phones are used to dial 911 in cases of emergency. However, even when 911 is dialed in, it is still difficult to ascertain the location of the cellular phone, either by radio direction finding techniques, or by cellular ranging techniques. As a result, even though the United States Coast Guard has authorized the utilization of *CG to automatically dial a Coast Guard telephone number, it is impossible for the Coast Guard to locate vessels in distress due to the lack of location information on the transmission.

This lack of ability to locate a cellular phone also applies not only to vessels at sea but also to vehicles or persons in distress. Not only do vehicles get into emergency situations in which an airbag is deployed and one tries to dial 911, many have tried to use cellular phones and 911 to foil a hijacking or theft of a vehicle.

In the past, cellular phones have been utilized to digitally signal the location of an emergency situation through a system provided by the Code Alarm company. Such a system utilizes information from a LORAN and causes the cellular phone to dial an 800 number. The cellular phone then transmits digital information concerning vehicle identity and location to a monitoring location. It will be appreciated that specialized demodulation equipment must be provided at the monitoring site to be able to decode the digital information. More importantly, the Code Alarm system requires a specific digital format or sentence structure which is not universally decodeable by others. Thus, implementing such a system requires both specialized demodulation equipment and paid personnel to man the particular telephone number on a 24-hour basis. Such systems are not only costly to implement, but are also costly to the user and usually require monthly user fees.

By way of further background, another type of cellular phone vehicle location system is one in which a ranging system is built into cell site protocols. However, to adequately cover a city, approximately 10 cell sites all equipped with the ranging programs must be in place. While this system operates to identify and locate a vehicle in distress, it is even more expensive to man and operate than the Code Alarm system due to the initial cost of the ranging programming, to say nothing of the additional towers necessary.

SUMMARY OF THE INVENTION

In order to achieve a low cost universal monitoring system for emergencies, the aforementioned synthetic voice technique of Tendler is expanded to include a dialer which is responsible for dialing the appropriate number for the cellular or dialable phone. Thus, the expanded system includes an Emergency Vessel/Vehicle Location System (EVLS) printed circuit board or module for voice synthesis and location decoding; and a dialer/activation detector. Location information is available from suitable navigation units such as a LORAN or GPS, both of which output latitude and longitude on an NMEA 0183 bus.

The appropriate number to be dialed may either be preset, specified through detection of signals from the keypad of the telephone, or set via receipt of the telephone number to be dialed from the closest cell site or other fixed transmitter. Additionally, the activation detector activates the system upon either detection of telephone keypad signals or activation from an external source such as a panic button, airbag deployment, intrusion detection, pager activation or DTMF tone detection.

For instance, in the Subject System a user might dial 911 from the cellular telephone. This is detected by the dialer/activation detector. The dialer/activation detector then activates the EVLS and dialer module to first cause the telephone to go off hook and then dial the particular number. Thereafter the telephone is modulated on a periodic basis with a message which includes the fact of an emergency situation, the identity of the vehicle or vessel, and the latitude and longitude from a GPS or LORAN unit coupled to the EVLS Module. Currently GPS units and LORAN provide location information over what is known as an NMEA 0183 interface, with the EVLS board carrying the synthetic voice chip and a decoder utilized to decode the NMEA 0183 lat/lon sentence and provide a verbal rendition of the latitude and longitude to the cellular phone. The EVLS board also is preloaded with the vessel or vehicle number as described in the aforementioned patent applications and as provided in Shakespeare model SE6000, SE2550 and SE2500 MD VHF radios.

In addition to activation from the keypad of a telephone, external activation can include as an input, a panic button either hidden or visible, a hijack detector, a remote pager for actuating the system to radio vehicle or vessel location to a home office, a car theft alarm, or in the case of an accident, an airbag deployment detector. For police and other type of emergencies, a man down detector may be utilized to activate the system.

Note that the dialer and activation detector may be interposed between the keypad and the cellular phone transceiver. From a functional point of view, if one considers that the keypad is responsible for issuing DTMF tones, in one embodiment the dialer/activation detector includes a DTMF detector and tone generator such that the activation detector responds to predetermined tones from the telephone keypad prior to their transmittal to the transceiver and interrupts the normal operation of the keypad. This gives the dialer control of the transceiver. At the same time, detection of these tones activates the EVLS and dialer modules. The dialer then provides DTMF tones to the transceiver for dialing the appropriate telephone number.

Alternatively, the dialer/activation detector detects bus signals corresponding to keypad actuation and provides back appropriate bus signals suitable for actuating the internal DTMF dialer in the phone.

In the case of a user dialing 911, the dialer may merely pass the 911 back to the telephone as the original 911 signals. Alternatively, for Coast Guard rescue one might dial *CG at which time the corresponding signals are detected, and the appropriate signals for the telephone number are generated to dial the nearest Coast Guard station. Note that the appropriate Coast Guard station would be presumably that closest to the cellular phone site receiving the telephone call. Alternatively, to dial state police, one might dial *SP, with the dialer then either passing through the *SP signals or generating signals to dial the appropriate state police number, depending on which state the cell site receiving the telephone call is located.

In one embodiment, programming at each fixed cellular phone site instructs the dialer which number to dial. For instance, in one embodiment, a cell site to stores the number of the local police department or the number of the local hospital, such that when a cellular phone is picked up by the site, the appropriate telephone number is transmitted to the cellular phone and is loaded into the dialer. Upon activation, the cellular phone then dials the appropriate entity so that local help can be summoned.

It is another feature of the Subject Invention that a vehicle or vessel can be instructed to "call home" for instance, to the dispatcher of a cab company, the home office of a rental car agency, a school bus dispatcher, or other designated entity. This permits ascertaining the whereabouts of the vehicles or vessels merely by calling the cellular phone number of the vehicle or vessel and providing DTMF activation tones to activate the EVLS and dialer modules. Thus, for instance, a cab company having cabs with cellular phone capabilities can call the telephone number of a cab and transmit the appropriate DTMF tones to receive a verbal rendition of the cab registration number and its latitude and longitude. Likewise, a rental car agency can utilize the same system to locate its rental cars by dialing the appropriate telephone number for the rental car, assuming the rental car is equipped with a suitable cellular phone. Additionally, if a car is stolen, the owner of the car can call the cellular telephone number of the phone in his car and dial in a special DTMF code so as to be able to find out where the stolen car is.

As to external activation, it will be appreciated that, for instance, should a rental car be provided with a suitable cellular phone, upon the occurrence of a dangerous situation, the occupant of the car can depress a "panic" button to have the phone either call 911 or an 800 number for the rental car company so as to be able to summon help. Alternatively, an additional "where am I" button can be provided such that when depressed the cellular phone can be utilized to call the rental car company to apprise the rental car company of the location of the vehicle. This enables an operator to direct the occupant of the vehicle where to go by giving him suitable directions over the cellular phone.

In terms of hijacking, as mentioned before, either pager activation of the unit or activation through calling of the telephone number of the cellular phone may be utilized to locate the hijacked car once the individual has gotten out of the car safely. If activation is required while the hijacked individual is in the car, the operation can be silent so as not to annoy the hijacker.

Car theft is another application in which, when a car is stolen, the cellular phone is turned on, the system activated and the number called may either be 911 or any number the owner of the vehicle specifies.

An important use for the Subject System is in the area of EMT operations. As is often the case during an accident, time is of the essence in order to rescue and resuscitate the occupants of a vehicle involved in an accident. In one embodiment, external activation is from an airbag which upon deployment, causes the cellular phone to transmit the emergency message to wherever the dialer directs. Especially in rural areas, where locating a vehicle is difficult, this type of system provides the authorities with instant location information so that EMT units may be directed to the scene as quickly as possible.

With respect to police man down situations, currently, police VHF radios have man down buttons which, when depressed, digitally radio the identity of stricken individuals. This type of system can be expanded with the subject EVLS, a dialer/activation detector and the utilization of a LORAN or GPS coupled to the subject EVLS board. Thus the identity and location of a stricken officer can be instantly ascertained, not digitally, but rather via verbal annunciation.

It is, of course, possible that the cellular phone may be transportable and carried on the person. Thus the Subject System applies not only to vehicle or vessel mounted apparatus but also to man portable units as well.

Note that while the Subject Invention has been described for use with cellular phones, other DTMF based phones such as conventional telephones and Satcom phones are within the scope of this invention.

Moreover, while it is possible to provide a portable unit with its own self-contained GPS or LORAN, in one embodiment, the phone may be carried in a holder or holster to which NMEA 0183 data is provided on a continual basis. The EVLS board and dialer/activation detector stores the last latitude and longitude transmitted over the NMEA 0183 interface as long as the telephone is in the holster. In an emergency situation, it is often required that the telephone be removed from the holster, and with storage of the last latitude and longitude, the portable unit may be removed from an accident scene sufficiently to get out of danger. The phone is then utilized to signal for help, secure in the knowledge that the last position will be transmitted. In one embodiment, the EVLS and dialer module is activated upon removal of the cellular phone from its holster such that the cellular phone can provide both an emergency location function and also serve as a communications device, unlike conventional EPIRBs or ELTs. The storing of the last latitude and longitude is also important in the case of theft or hijacking when a thief or perpetrator seeks to disable a system by removing the GPS or damaging the navigational unit. This also protects against antenna removal.

In summary, an emergency vessel/vehicle location system includes a navigation unit to determine position and speech synthesis to modulate the section transmitter of a transceiver with the emergency message. The message typically includes both an identity number for the vehicle/vessel, as well as a verbal rendition of the decoded location from the navigation unit. The system is activated by a combined dialer and activation detector. Activation may either be from DTMF tones received by the transceiver, detecting predetermined keypad actuations or from external activation, such as from a panic button, a Lojack/hijack sensor, a car theft alarm, airbag deployment, man down sensor, or other form of remote activation. When utilized with phones which utilize DTMF tones to dial a particular number, upon activation, the activation detector/dialer provides a DTMF dial command signals corresponding to a predetermined telephone number such that the transceiver can initiate a telephone call. Thereafter the transmitter for the transceiver is modulated with the emergency message in natural speech. As to cellular phones, the dialer and activation detector may be actuated with signals from the keypad of the cellular phone, such as 911, *CG, *SP or other predetermined activation codes. The number to be dialed is entered into the dialer prior to using the device, or optionally, the number to be dialed can be transmitted to the cellular phone and thence to the dialer when, for instance, a cellular phone is within range of a given cell site. This permits a fixed transmitter at a cell site to determine the number to be dialed. Additionally, power turn on may be accomplished remotely via a paging system such that the cellular phone may be made to "call home" via pager activation which turns the system on and then actuates it to broadcast the verbal message. Alternatively, if the system is already turned on, a remote "call home" function can be achieved through the dialing of the cellular phone number and transmitting a predetermined DTMF activation code.

BRIEF DESCRIPTION OF THE DRAWINGS

These and other features of the Subject Invention will be better understood in conjunction with the Detailed Description in conjunction with the Drawings of which the sole drawings is a block diagram of a cellular phone based automatic emergency vessel/vehicle location system, in which an EVLS module and a dialer and activation detection module are combined to provide that the cellular phone dial a predetermined number upon actuation and to provide various means of activation for the system.

DETAILED DESCRIPTION

As will be seen from the sole drawing figure, a cellular phone 10 includes a keypad 12, a microphone 14, and an earpiece 16 along with a suitable antenna 18. Coupled to the cellular phone is an EVLS and dialer module 20 which includes an EVLS module in the form of a printed circuit board 22 and a dialer and activation detector 24.

In one embodiment, module 20 is coupled between the keypad and the cellular phone transceiver to be able to interrupt selected keypad signals prior to transmission to the transceiver. This permits the module to respond to EVLS-related keypad actuation and to place the appropriate signals on the bus between the keypad and the transceiver. Thus the module can interrupt and replace keypad commands. It is noted that for some cellular phones the keypad controls a DTMF tone generator within the transceiver. By interrupting and altering the keypad signals to the tone generator within the transceiver, the functions attributed to the dialer and activation detector in module 20 can be duplicated. However, for convenience in describing the Subject System, it will be assumed that DTMF tones are generated by the keypad and are both detected at and generated in the module.

EVLS board 22 contains a location detection circuit for detecting the location determined by a GPS 26 and transmitted to board 22 via an NMEA 0183 interface bus 28. The function of the location detection circuit is to derive a number which is then verbalized along with a message that is preencoded and provided to a conventional speech synthesizing circuit which synthesizes a predetermined message and provides it over a line 30 to the modulation section of the telephone.

It will be appreciated that location detection and speech synthesis is now commonplace and is available from ACR Electronics, Inc. of Ft. Lauderdale, Fla. as ACR Model No. EVLS-1000.

It is the purpose of the EVLS board to decode location and to provide the emergency message which includes the fact of an emergency and the location of the vehicle/vessel or person at which the EVLS and dialer module is located.

This message may be repeated once or as many times as required, with the message being terminated either on a time basis, by the actuation of any key in the keypad 12, or even by voice operated relays or voice commands should such be desired.

In order to activate the EVLS board, dialer and activation detector 24 includes a DTMF detector for detecting DTMF tones or equivalent bus signals from keypad 12. It also can be made to respond to any DTMF tones available from the audio output circuit of the phone which are sent from a remote location to the cellular phone, such as a predetermined code to have the system dial a predetermined number to give the location of the vehicle/vessel or person. Conventional programming determines which DTMF tones will be acted upon and the consequence of the action.

Upon detection of DTMF tones or equivalent bus signals which cause the activation of the unit, the dialer portion causes the cellular phone to go off hook and dial the telephone number that has been preset into the dialer. This number can be preset in any number of conventional ways as illustrated at 32 or, optionally, as illustrated at 34, the number to be dialed can be obtained by receipt of remotely generated signals transmitted to the cellular phone transceiver such that the number to be dialed can be determined, for instance, by a predetermined signal from a cell site within range of the cellular phone.

It will be appreciated that remote activation of the Subject System can be accomplished, assuming the cellular phone is turned on, by the dialing of the cellular phone number and the transmission of predetermined DTMF activation tones which are detected by activation detector 24.

The result of the activation of module 20 is that a message is verbally broadcast, such as the message "MAYDAY MAYDAY MAYDAY ... NY 810RYF ... Position 40.21.02 North by 80.16.23 West". It will be appreciated that such information can be readily written down by hand and the position of the cellular phone determined by plotting this position on a conventional map.

It will also be appreciated that upon activation, an activation signal 36 from detector 24 is applied to EVLS board 22 such that upon providing an off-hook condition for the cellular phone, the EVLS board is actuated to modulate the modulator section of the transmitter for the cellular phone.

In one embodiment, external activation of module 20 is provided by a number of different activation signals. The result however of such external activation is the same in that the dialer and activation detector 24 detects the external activation signal and causes the telephone to go off-hook and to dial the appropriate number, thereafter activating the EVLS board to modulate the transmitter section of the cellular phone with the appropriate emergency message.

Such external activation can be, for instance, a panic button 40 carried anywhere on the vehicle or person which causes the cellular phone to transmit the position of the cellular phone upon actuation.

Secondly, as illustrated at 42, the location of a vehicle or person can be obtained by a remote pager activation. This subsystem can also be actuated by a hijack victim who calls a pager number to have the cellular phone "call home". The purpose of pager activation is to be able to turn on the cellular phone as illustrated at 44 should the phone be off. While it is possible to provide cellular phones which are hardwired to the battery and left on, this is not the usual case. Rather, by utilizing a low current draw pager receiver, the cellular phone can be turned on and module 20 activated to have the cellular phone call back to the preloaded number with the location.

As illustrated at 46, traditional car theft alarms can be utilized to activate the cellular phone, including a turn-on function, whereas an airbag as illustrated at 48 upon deployment may be utilized to activate the system.

As illustrated at 50, a man down type of activation is appropriate for personally carried cellular phones in which, when a stricken officer falls to the ground, an activation signal is provided to module 20. Of course, the man down activation can be by separate button or switch on the person.

As illustrated at 52, if the cellular phone is in a holster, then upon removal of the phone from the holster, the cellular phone may be made to store the last latitude and longitude and then call a predetermined number for indicating an emergency situation.

The ability to store the last latitude and longitude applies whether or not a holder-based system is used for the cellular phone. For individuals wishing to steal a car or to hijack it, their first line of defense may be to rip off the GPS antenna, LORAN antenna, or in fact, any other piece of equipment related to location detection. Should this be done, module 20 nonetheless stores the last latitude and longitude which provides at least a starting point for the search being established by the broadcast of this position.

It will further be appreciated that the apparatus illustrated in boxes 40–52 is commercially available and that each's function to produce an external activation signal is well known. Furthermore, activation by either a panic button, a location/hijack unit, a car theft alarm, an airbag, a man down detector or in fact any external activation can be utilized to provide a power-on signal to the cellular phone should the cellular phone not already be on. Whether it is the depressing of a button, the switching of a switch, the detection of an airbag deployment, or activation by a remote means such as a pager, the external activation nevertheless can be made to place a signal on power-on line 44 to make sure that the cellular phone is in fact on.

It will be appreciated that a bus comprising lines 60 and 64 is provided between keypad 12, module 20 and the remainder of the cellular phone transceiver. Thus the number to be dialed and the off-hook condition can be established through signalling over line 60 which provides the DTMF tones or equivalent bus commands to the transceiver as well as an off-hook or dialing command.

Likewise as illustrated at 62, activation either from the keypad or from remotely generated DTMF tones, is coupled directly to the dialer and activation detector 24. This being the case, any predetermined DTMF activation code, detected by the activation detector through its DTMF detection circuits, can be utilized in the actuation of the system.

While the Subject System has been described in connection with cellular phones, it will be appreciated that the Subject System has application to any phone system utilizing DTMF tone dialing, be it cellular, satellite or land line based. For mobile phones, location can be ascertained from LORAN, GPS, OMEGA or SATNAV systems, whereas for fixed locations the position can be preloaded into the speech synthesizer. This System thus includes household use where the coordinates are voice synthesized and verbally broadcast or transmitted.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. An emergency location system for transmitting a synthesized voice message including geographic coordinates from one location to another over a cellular phone at the time of an emergency, comprising:

a cellular phone at said one location, said cellular phone including a transmitter having a modulation section means for generating DTMF tones corresponding to a telephone number, keypad generating signals for controlling said means for generating DTMF tones to dial telephone numbers, means for transmitting said tones to place a call and a bus for controlling said phone and for coupling remotely generated analog audio signals corresponding to an emergency message the modulation section of said transmitter;

means coupled to said bus for providing said remotely generated audio signals to said modulation section said said signals including a predetermined synthesized verbal message including the geographic coordinates of said phone for the modulation thereof;

means for providing an emergency message transmission activation signal; and a dialer/activation detector coupled to said bus and electrically interposed between said keypad and said means for generating said DTMF tones and responsive to the provision of said activation signal for locking out said keypad during said emergency message and for generating output signals to capture the operation of said cellular phone so as to control the dialing operation thereof from said dialer/activation detector only during said emergency message transmission, and relinquishing said control after said emergency message has been transmitted, said dialer/activation detector including means for causing said DTMF tone generating means to provide tones for dialing predetermined telephone number by interrupting portion of said keypad during said emergency message, thus effectuate a substitution of said dial at output signals said keypad generated signals during said emergency message and for actuating said synthesized verbal message providing means to modulate said transmitter section with said emergency message.

2. The System of claim 1, wherein said cellular phone has an audio output and wherein said means for providing said message activation signal includes DTMF tone detection means coupled to said audio output and means coupled to said DTMF tone detection means for providing said activation signal upon detection of a predetermined DTMF code.

3. The System of claim 1, and further including means for coupling said means for providing said message activation signal to said keypad, said last mentioned means including means responsive to selected keypad activation for providing said activation signal.

4. The System of claim 1, and wherein said means for providing said message activation signal includes pager-based means for both turning on said cellular phone and for providing said activation signal responsible to receipt of a predetermined paging signal.

5. The System of claim 1, wherein said means for producing said activation signal includes auxiliary activation means.

6. The System of claim 5, wherein said auxiliary activation means includes a switch.

7. A system for transmitting a synthesized voice message including geographic coordinates from one location to another over a cellular phone, comprising:

a cellular phone at said one location, said cellular phone including a transmitter having a modulation section, means for generating DTMF tones corresponding to a telephone number, a keypad generating signals for controlling said means for generating DTMF tones to dial telephone numbers, means for transmitting said tones to place a call and a bus for controlling said phone and for coupling remotely generated analog audio signals to the modulation section of said transmitter;

means coupled to said bus for providing said remotely generated audio signals to said modulation section, said signals including a predetermined synthesized verbal message including the geographic coordinates of said phone for the modulation thereof;

means for providing a message transmission activation signal;

a dialer/activation detector coupled to said bus and electrically interposed between said keypad and said means for generating said DTMF tones and responsive to the provision of said activation signal for generating output signals to capture the operation of said cellular phone so as to control the dialing operation thereof from said dialer/activation detector, said dialer/activation detector including means for causing said DTMF tone generating means to provide tones for dialing a predetermined telephone number and for interrupting said keypad during dialing to effectuate a substitution of said dialer output signals for said keypad generated signals during dialing and thereafter actuating said synthesized verbal message providing means to modulate said transmitter section with said message;

a cell site having means for transmitting a signal corresponding to a number to be dialed to all cellular phones within range of said cell site; and, means within said cellular phone for detecting the signal corresponding to the number to be dialed and for causing said cellular phone to call said number upon provision of said activation signal.

* * * * *